(12) United States Patent
Liou

(10) Patent No.: US 7,206,917 B2
(45) Date of Patent: Apr. 17, 2007

(54) ADDRESS DECODING METHOD AND RELATED APPARATUS BY COMPARING MUTUALLY EXCLUSIVE BIT-PATTERNS OF ADDRESSES

(75) Inventor: Ming-Shi Liou, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 410 days.

(21) Appl. No.: 10/707,645

(22) Filed: Dec. 30, 2003

(65) Prior Publication Data

US 2004/0172497 A1 Sep. 2, 2004

(30) Foreign Application Priority Data

Feb. 27, 2003 (TW) .............................. 92104319 A

(51) Int. Cl.
G06F 12/02 (2006.01)
G06F 12/00 (2006.01)
G11C 8/12 (2006.01)
G11C 8/00 (2006.01)

(52) U.S. Cl. ...................... 711/209; 711/203; 711/202; 711/200; 711/172; 711/170; 711/100

(58) Field of Classification Search ..................... None
See application file for complete search history.

(56) References Cited

U.S. PATENT DOCUMENTS

| | | | | |
|---|---|---|---|---|
| 3,938,100 A | * | 2/1976 | Steiner | 711/206 |
| 3,982,231 A | * | 9/1976 | Bernstein et al. | 711/153 |
| 4,025,903 A | * | 5/1977 | Kaufman et al. | 711/5 |
| 4,234,934 A | * | 11/1980 | Thorsrud | 711/212 |
| 4,400,794 A | * | 8/1983 | Koos | 711/202 |
| 4,468,729 A | * | 8/1984 | Schwartz | 711/172 |
| 4,587,610 A | * | 5/1986 | Rodman | 711/207 |
| 4,654,787 A | * | 3/1987 | Finnell et al. | 711/172 |
| 4,730,251 A | * | 3/1988 | Aakre et al. | 710/104 |
| 4,860,252 A | * | 8/1989 | Sykora | 711/5 |
| 4,914,577 A | | 4/1990 | Stewart et al. | |
| 4,965,720 A | * | 10/1990 | Mitchell et al. | 711/202 |
| 5,737,572 A | | 4/1998 | Nunziata | |
| 5,835,963 A | | 11/1998 | Yoshioka et al. | |

(Continued)

OTHER PUBLICATIONS

D.A. Huffman, A Method for the Construction of Minimum-Redundancy Codes. In Proc. of IRE, pp. 1098-1101, 1952. □□ □□*

(Continued)

*Primary Examiner*—Sanjiv Shah
*Assistant Examiner*—Samuel Dillon
(74) *Attorney, Agent, or Firm*—Winston Hsu

(57) ABSTRACT

A memory address decoding method for determining if a given address is located in one of a plurality of sections. Each section has a plurality of memory units arid each memory unit has a unique corresponding address, the corresponding address using the binary system. The method includes making die corresponding address in a section with greater size smaller than the corresponding address in a section with smaller size, building a single bit-pattern for each section from all corresponding addresses, and comparing if at least one comparative bit of the given address matches those in any of the bit-patterns so as to determine the given address is located in one of the sections based on the comparison.

4 Claims, 12 Drawing Sheets

U.S. PATENT DOCUMENTS

| | | | |
|---|---|---|---|
| 6,128,718 A * | 10/2000 | Schmisseur et al. | 711/212 |
| 6,219,748 B1 | 4/2001 | Srinivasan et al. | |
| 6,237,061 B1 * | 5/2001 | Srinivasan et al. | 711/108 |
| 6,389,507 B1 * | 5/2002 | Sherman | 711/108 |
| 6,615,311 B2 * | 9/2003 | Ramakrishnan | 711/108 |
| 7,013,355 B2 * | 3/2006 | Chambers | 710/110 |

OTHER PUBLICATIONS

Handy, Jim, The Cache Memory Book, 1998, Academic Press, Inc., 2nd ed., pp. 22.*

Hirschberg, Data Compression, Apr. 27, 1999, htp://www.ics.uci.edu/~dan/pubs/DC-Sec3.html.*

Wikipedia. Measure (mathematics). English Wikipedia. Feb. 6, 2003. http://en.wikipedia.org/wiki/Measure_(mathematics).*

A. Patterson and J. Hennessy. Computer Organization and Design—The Hardware/Software Interface. Morgan Kaufmann Publishers, 1998.*

H. Tzeng. Longest Prefix Search Using Compressed Trees. In Proceedings of IEEE Globecom, Nov. 1998.*

* cited by examiner

ADDRESS DECODING METHOD AND RELATED APPARATUS BY COMPARING MUTUALLY EXCLUSIVE BIT-PATTERNS OF ADDRESSES

BACKGROUND OF INVENTION

1. Field of the Invention

The present invention provides an address decoding method and related memory apparatus by comparing mutually exclusive bit-patterns of addresses.

2. Description of the Prior Art

Please refer to FIG. 1. FIG. 1 is a functional block diagram of a prior art computer 10. The computer 10 is a microprocessor system, comprising a CPU 12, a chipset 14, a memory apparatus 16, a display card 18, a monitor 20, a peripheral device 22 and a basic input and output system (BIOS) 24.

The memory apparatus 16 usually consists of a few memory modules. For example, there are four memory modules 30A to 30D shown in FIG. 1. Each memory module 30A to 30D comprises a plurality of memory units 34. Each memory unit 34 is used for recording one bit of digital data. The total amount of size of memory apparatus 16 is the sum of the memory size of each memory unit 34 in the memory module 30A to 30D. In the prior art, the memory module is implemented as an independent circuit that can be connected to the computer 10 through the slot so as to compose the memory apparatus 16. The memory size of each memory module can be different. The user can equip his/her own computer with memory modules of different memory sizes as needed. General speaking, the memory units of the memory modules will be located in two rank memory arrays. For example, as shown in FIG. 1, there are two rank memory arrays 32A and 32B in the memory module 30A. The control circuit 28 will control data access to a rank memory array using a control signal. As shown in FIG. 1, the control signals CSp0 and CSp1 are associated with the two rank memory arrays 32A and 32B respectively in the memory module 30A, and the control signals CSp2 to CSp7 are associated with the rank memory arrays in the memory module 30B, 30C and 30D.

As for the address assignment of memory units in the memory apparatus 16, please refer to FIG. 2 (and also FIG. 1). FIG. 2 is a diagram showing the address assignment of each memory unit in the prior art. As shown in FIG. 2, given that the memory modules 30A to 30D respectively have $2^{25}$, $2^{27}$, $2^{28}$ and $2^{26}$ memory units, the memory size of the modules 30A to 30D is 32 MB, 128 MB, 256 MB and 64 MB respectively. When the computer reboots, the control circuit 28 will assign the addresses previously increased incrementally to each memory unit in the memory modules 30A to 30D. Certainly the associated address of each memory unit is represented as a binary address. For example, as shown in FIG. 2, the associated address of each memory unit is represented as a 32-bit binary number, starting from Bit 0 as the least significant bit (LSB) and ending with Bit 31 as the most significant bit (MSB). After assigning the address, the first memory unit of the memory module 30A will be assigned the address 36A, a binary number of "000 . . . 0" (all 0s). The following associated address of each memory unit will increase by degrees in sequence. Take the second and third memory unit as an example, the address of the second unit is 36B, a binary number of "00 . . . 01" (only Bit 0 is 1) while the address of the third unit is 36C, an incrementally increased value "0 . . . 010" (only Bit 1 is 1"). When it comes to the second unit from the end, the associated address has been increased to "0 . . . 01 . . . 10" (Bit 1 to Bit 24 are 1 and the rest are 0); and for the last memory unit (that is, the $2^{25th}$ memory unit), the associated address 36E, has been increased one from the address 36D to "0 . . . 01 . . . 1" (Bit 0 to Bit 24 are 1 and the rest are 0).

When the control circuit 28 is performing the address assignment, the apparatus 16 will view all the memory units in the memory modules as a whole. Therefore, when the control circuit 28 is assigning addresses to units in the memory module 30B, the value of the address will continuously be increased incrementally from the address 36E, which is the largest address in the memory module 30A. As shown in FIG. 2, the first memory unit of the memory module 30B will he assigned the address 38A; the value of the address 36E will be increased by one to "0 . . . 010 . . . 0" (only Bit 25 is '1'), which represents the $(2^{25}+1)^{th}$ memory unit of the memory apparatus 16—that is, the $(2^{25}+1)^{th}$ memory unit counting from the first memory unit of the memory module 30A (the memory unit associated with the address 36A). Similarly, the second memory unit in the memory module 30B will be viewed as the $(2^{25}+2)^{th}$ memory unit in the memory apparatus 16, and its associated address 38B will be increased by one from address 38A to a binary number of "0 . . . 010 . . . 01." (Only Bit 0 and Bit 25 are '1') Since there are $2^{27}$ memory units in the memory module 30B, the last two memory units in the memory module 30B will become the $(2^{25}+2^{27}-1)^{th}$ and the $(2^{25}+2^{27})^{th}$ memory units in the memory apparatus 16, and their associated addresses 38C and 38D will be increased respectively to "0 . . . 01001 . . . 10" (Bit 1 to Bit 24 and Bit 27 are '1', and the rest are '0') and "0 . . . 01001 . . . 11" (Bit 0 to Bit 24 and Bit 27 are '1' and the rest are '0').

By the same token, in the memory module 30C (that is, the third memory module), the associated address 42A of its first memory unit (that is, the smallest address in the memory module 30C) will be increased by one from the value of address 38D to a binary number of "0 . . . 01010 . . . 0" (only Bit 25 and 27 are 1), which also represents the $(2^{25}+2^{27}+1)^{th}$ memory unit counting from the memory unit in address 36A. When it comes to the $2^{28th}$ address 42B in the memory module 30C (that is, the largest address in the memory module 30C), its value will be increased to a binary number of "0 . . . 011001 . . . 1" (Bit 0 to B24, Bit 27 and Bit 28 are 1 and the rest are 0), which represents the $(2^{25}+2^{27}+2^{28})^{th}$ address linearly increased from the address 36A. Similarly, in the fourth memory module 30D, the address 44A is associated with the first memory unit to a binary number of "0 . . . 011010 . . . 0" (Bit 25, 27 and 28 are 1) while the address 44B of the last memory unit is increased to "0 . . . 011101 . . . 1" (Bit 26 to 28 and Bit 0 to 24 are 1 and the rest are 0), which represents the $(2^{25}+2^{27}+2^{28}+2^{26})^{th}$ address counting from the address 36A.

After assigning the address, the first and the last addresses in each memory module will be assigned an ending address. As shown in FIG. 2, all the addresses are smaller than the first address 38A in the memory module 30B. Therefore, the address 38A can be viewed as the ending address 46A associated with the memory module 30A. Similarly, in the memory module 30B (and the memory module 30A), addresses assigned to each memory unit are smaller than the smallest address 42A in the memory module 30C. Therefore, the address 42A can be viewed as the ending address 46B associated with the memory module 30B. On the other hand, all the addresses assigned to the memory module 30C, 30A and 30B are smaller than the ending address 46C (that is, the smallest address 44A in the memory module 30D) associated with the memory module 30C. Finally, all the addresses in the memory module 30D are smaller than the ending address 46D. Please note that the ending address 46A to 46D are the result of the unit address increment in each memory module. Given that the ending address 46A shows a binary number of $2^{25}$, that number also represents the memory size of the memory module 30A (the amount of memory units in the memory module 30A); the ending address 46B is represented as a binary number of $(2^{25}+2^{27})$, which is the total amount of the memory size of the memory module 30A and 30B; the ending address 46C is represented as a binary number of $(2^{25}+2^{27}+2^{28})$, that is the total amount of the memory size of the memory module 30A, 30B and 30C. Finally the ending address 46D is represented as $(2^{25}+2^{27}+2^{28}+2^{26})$, which is also the total amount of the memory size of the memory module 30A to 30D.

Please refer to FIG. 3 (also FIG. 1 and FIG. 2). FIG. 3 is a functional block diagram, which shows how the control circuit 28 performs initial address decoding. In the control circuit 28, there is an access module 51, a plurality of subtraction modules 48A to 48D, and a logic module 50. The access module 51 is used for caching the given address 54 the CPU (or other circuits) transmitted to the control circuit 28; and the control circuit 28 will perform the initial address decoding. In the prior art, when the control circuit 28 is going to perform initial address decoding for determining in which memory module this given address 54 is located, the control circuit 28 can use software or hardware to implement the subtraction modules 48A to 48D and the logic module 50. The subtraction modules 48A to 48D are used to subtract the given address 54 from the ending addresses 46A to 46D in order to determine which one is smaller, the given address or the ending address 46A to 46D. (Please also refer to FIG. 2.) The logic module 50 will further integrate the result of the subtraction module to determine the memory module in which the given address 54 is located. The associated decoding result will also trigger a series of signals, such as the directive signals HPA to HPD to represent the memory module in which the given address 54 is located.

Given that the address 54 is located in the memory module 30A, the given address 54 will be smaller than each ending address 46A to 46D. Given that the address 54 is located in the memory module 30B, the given address 54 will be smaller than the ending address 46B to 46D but not smaller than the ending address 46A. Similarly, when the memory unit associated with the given address 54 is located in the memory module 30D, the given address 54 is only smaller than the ending address 46D but not smaller than the ending address 46A to 46C. As shown in FIG. 3, if the given address 54 is "0 . . . 010010 . . . 0" (only Bit 25 and 28 are "1"), it is not smaller than the ending address 46A and 46B but smaller than the ending address 46C and 46D. As a result, the logic module 50 can determine the memory unit associated with the given address 54 in the memory module 30C. Furthermore, the logic module can "bring up the voltage of the directive signal HPC to a higher state of "1" (or "true" logically) for representing that the given address 54 is located in the memory module 30C; and the voltage of other directive signal HPA, HPB and HPD is at a lower state "0" (or "false" logically) for representing that the given address 54 is not located in the memory modules 30A, 30B and 30D.

However, no matter if the subtraction modules in the prior art in FIG. 3 are implemented as hardware circuits or micro-controller software programs operated by the north bridge circuit 26A, the efficiency of the operation is not great. Take the embodiment of hardware circuit as an example; to implement a subtraction module to subtract one binary number from another, one can first get a complement (such as ones complement or twos complement) for one of these two numbers as the negative value of that number. Then the adder will add the negative value of that number to another number. While adding the two binary numbers together, the adder starts with adding the least significant bit (LSB, Bit 0) of the two numbers together and then adding the next bit of the two numbers together and then the next. The process will not stop until the adder finishes adding the most significant bit of the two numbers together.

As described above, while performing the addition of the two binary numbers, the addition of the bit in one position will not be performed until the carry bit, obtained from the addition of the previous bit of the two numbers, is returned. Therefore, the amount of time needed for the addition of the two binary numbers is the total time needed for adding bits in each position together. That is, the more bits the binary numbers have, the more time is needed for performing the addition. As a result, initial address decoding in the prior art has a clear influence by the characteristic. While the prior art in FIG. 3 compares the given address 54 with each ending address 46A to 46D by performing the operation of subtraction in the subtraction module, a considerable amount of time is consumed on the operation of subtraction, resulting in the low efficiency of initial address decoding. Due to the low efficiency of address decoding, the CPU 12 (see FIG. 1) cannot have rapid and efficient access to memory resources in the memory apparatus 16, and therefore drags down the operating efficiency of the computer 10 as a whole.

SUMMARY OF INVENTION

It is therefore an objective of the claimed invention to provide a method and related apparatus for decoding a given address in a memory device so as to solve the aforementioned problem.

According to the claimed invention, a memory address decoding method is provided for determining if a given address is located in one of a plurality of sections, each section having a plurality of memory units and each memory unit having a unique corresponding address, the corresponding address using the binary system. The method includes making the corresponding address in a section with greater size smaller than the corresponding address in a section with smaller size, building a single bit-pattern for each section from all corresponding addresses, and comparing if at least one comparative bit of the given address matches those in any of the bit-patterns so as to determine the given address is located in one of the sections based on the comparison.

DETAILED DESCRIPTION

The present invention decodes a given address in a memory device by comparing mutually exclusive bit-patterns of addresses. By using the sorting technique disclosed in the present invention, each memory module can be associated with one unique address based on its memory size while each address has its own mutually exclusive bit-pattern. In other words, for all addresses located in the same memory module, the value of some particular bits is fixed, such that fanning a common address shared by every address in the memory module. The common addresses associated with any two different memory modules will be exclusive. (That is, there must be at least a one-bit difference between common addresses of any two different memory modules.) For comparing whether the given address matches any common address of those memory modules, the present invention actually compares whether the value of a particular bit in the given address matches a fixed predetermined one. Since the comparison of patterns are implemented in the way of comparing whether the value of each bit of the given address matches its associated bit in the common address, the comparison does not require ripple carrying between different bits in the process of performing the addition. Thus far, the technique in the present invention can perform initial address decoding rapidly and efficiently so as to increase the access speed and efficiency of memory resources and the computing power of the computer as a whole.

Figure 2:
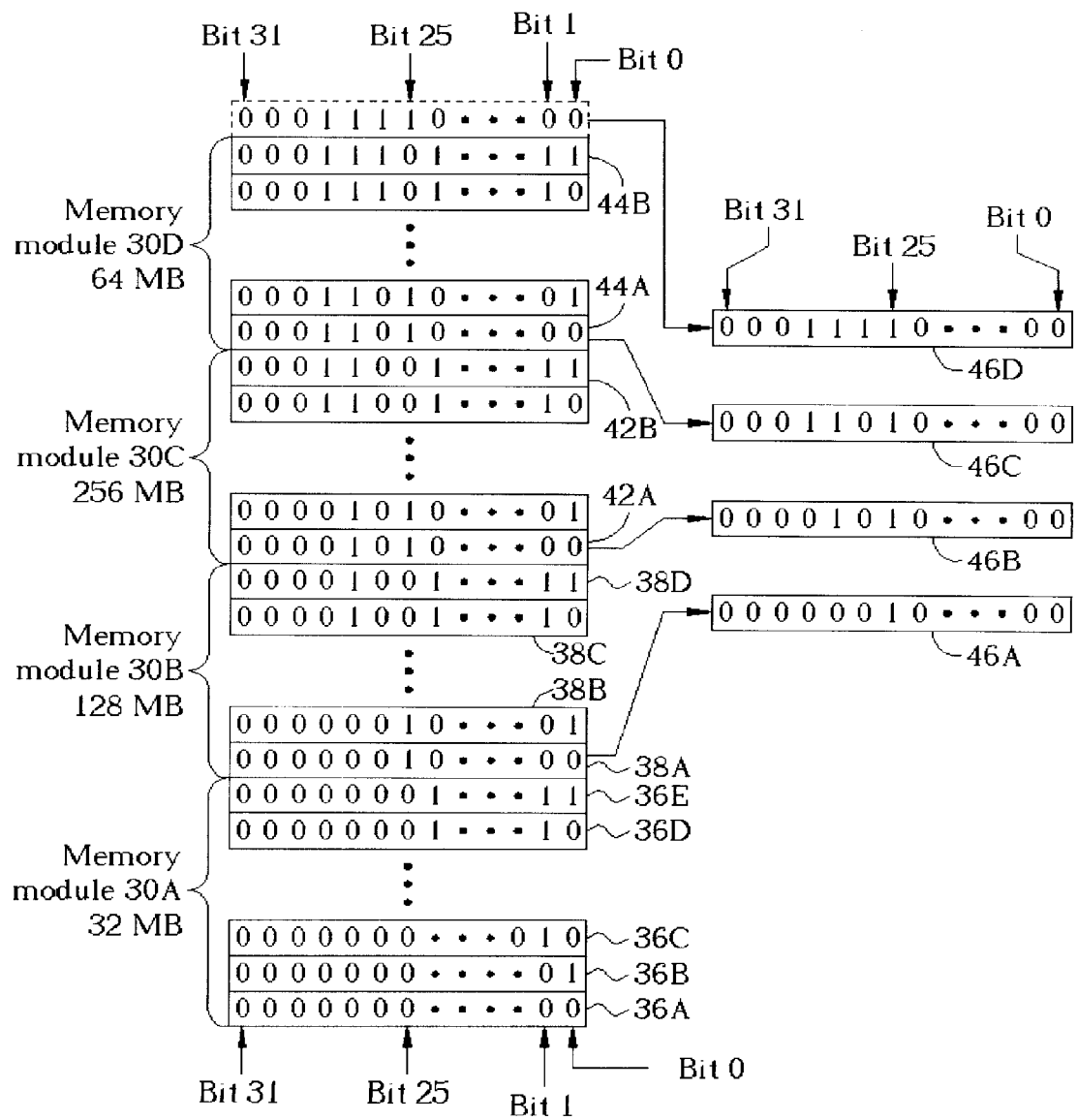
FIG. 2 is a diagram showing how an address of each memory unit is assigned in a memory apparatus in the computer in FIG. 1.
Figure 3:
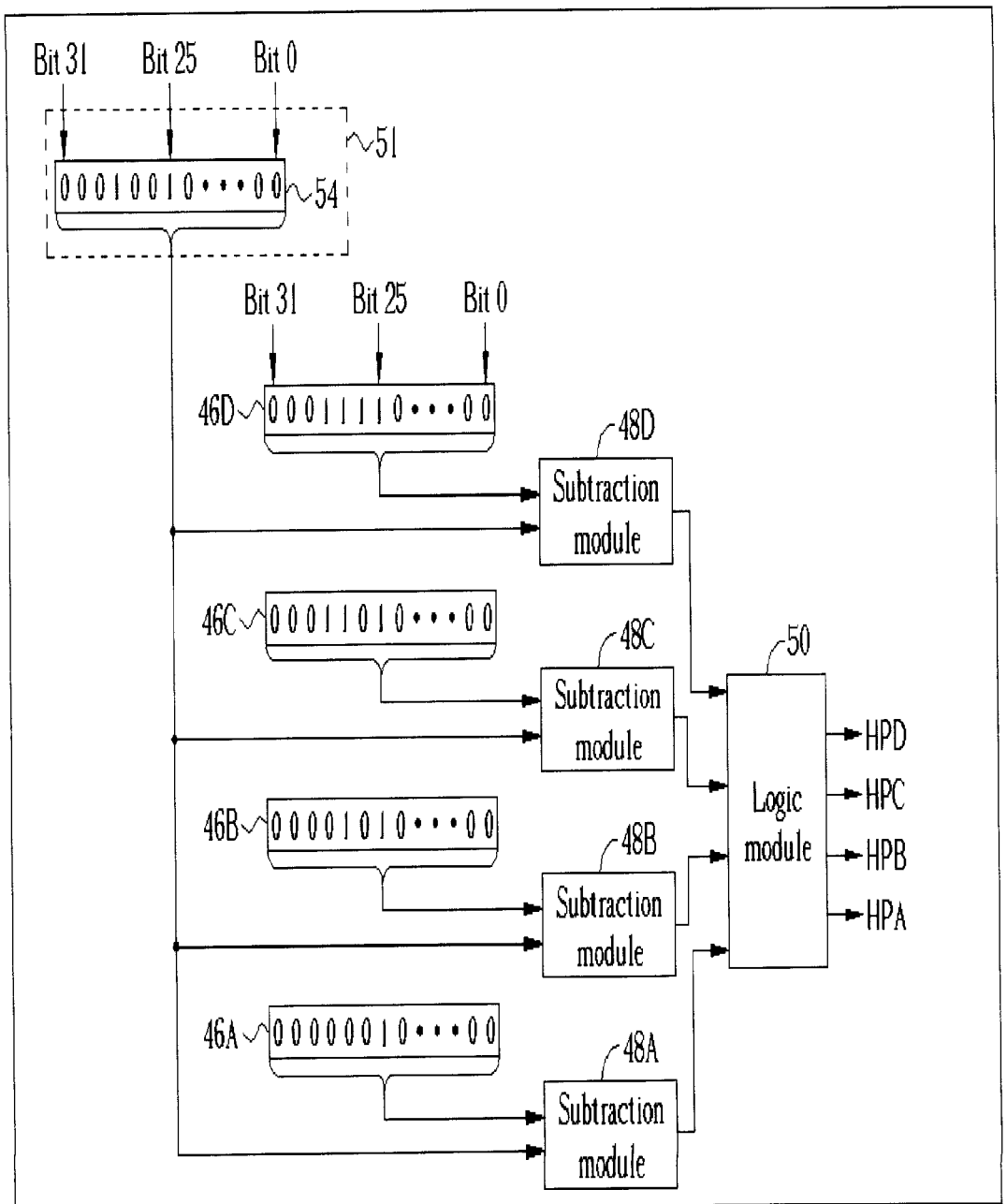
FIG. 3 is a functional block diagram showing how the computer in FIG. 1 performs initial address decoding in a prior art.
Figure 4:
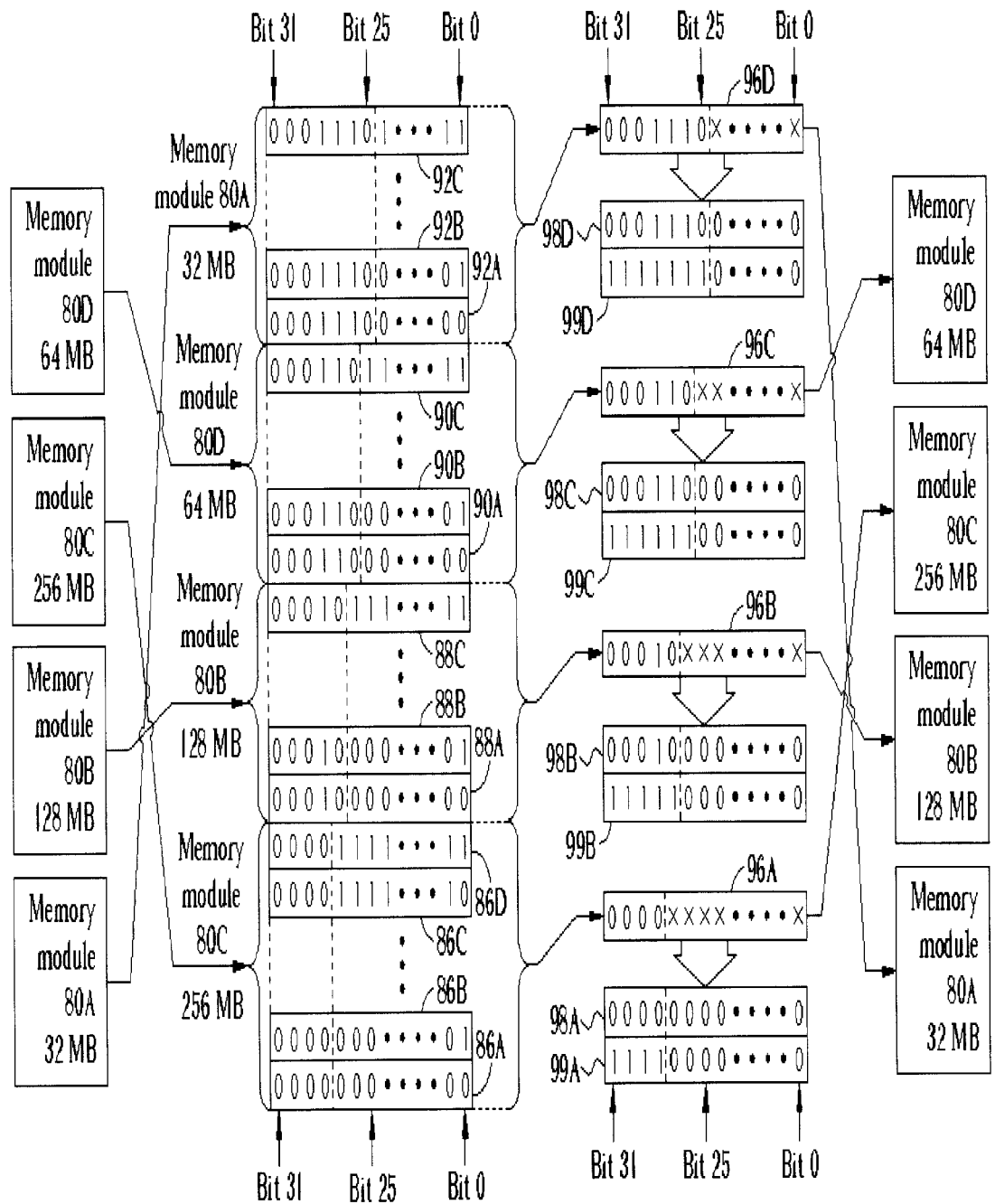
FIG. 4 is a diagram showing how an address of each memory unit is assigned.

Please refer to FIG. 4. FIG. 4 is a memory address allocation diagram showing how the address is assigned to each memory module. To facilitate the comparison with the prior art in FIG. 2, FIG. 4 makes an assumption that the memory module 80A to 80D in the present invention has a memory size of 32MB, 128MB, 256MB and 64MB respectively, that is, 2^25,2^27,2^28 and 2^26 memory units. The present invention will assign the linearly increased 32-bit binary address to each memory unit. However, the present invention will assign the address based on the memory size of each memory module. The basic principle of the present invention is that the larger the memory size of a memory module is, the smaller its assigned binary address will be.

Therefore, as shown in FIG. 4, while the present invention is assigning the address, it assigns linearly increased addresses to memory modules 80C, 80B, 80D and 80A in the order of their memory sizes. In other words, the memory module 80A with the smallest memory size is assigned the address of the largest value; the value of the assigned address of the memory module 80D is the second largest; the value of the assigned address of the memory module 80D is the third largest; and the memory module 80C of the largest memory size is assigned the address of the smallest value. As shown in FIG. 4, the first memory unit in the memory module 80C will be assigned to the address 86A with a value of a binary number "0 . . . 0" (all bits are 0), while other addresses in the memory module 80C are increased by degrees from the address 86A. For example, the address 86B "0 . . . 01" (only Bit 0 is 1) is a result of increasing the address 86A by one. After assigning linearly increased address to the 256 MB memory units in the memory module 80C, the addresses 86C and 86D assigned to the last two memory units have been increased to "00001 . . . 10" (Bit 1 to Bit 27 are 1) and "00001 . . . 1" (Bit 0 to Bit 27 are 1) respectively.

During the process of address assigning in the present invention, memory units in each memory module can be viewed as a whole. Therefore, for the memory module 80B to the memory size next to the memory module 80C, the value of the first address 88A being assigned (that is, the address of the smallest value in the memory module 80B) is "00010 . . . 0" (only Bit 28 is 1), a result of increasing the address 86D by one; the rest of the addresses in the memory module 80B are also resulting from the incremental accumulation of the address 86D. For example, the second address 88B is "00010 . . . 01" (only Bit 0 and Bit 28 are "1"), a result of increasing the address 88A by one. When it comes to the largest address 88C in the memory module 80B, the value has been increased to "000101 . . . 1" (Bit 0 to Bit 26 and Bit 28 are "1"), representing the three hundred and eighty four millionth address counting from the address 86A. With the same principle applied, the first address 90A "000110 . . . 0" (Bit 27 and Bit 28 are "1") results from increasing the address 88C of the memory module 80B by one. Other addresses in the memory module 80D are increased incrementally from the address 90A. Take the address 90B for example, the address 90B "000110 . . . 01" (Bit 0, Bit 27 and Bit 28 are "1") results from increasing incrementally from the address 90A. When it comes to the last address 90C (that is, the largest address in the memory module 80D), the associated address 90C is the four hundred and forty eight (256+128+64) millionth address.

Based on the present invention, when it comes to the memory module 80A of the smallest memory size, the address being assigned is the largest. The value of the first address 92A in the memory module 80A "0001110 . . . 0" (Bit 26 to Bit 28 are "1") results from increasing the address 90C in the memory module 80D by one. Other addresses in the memory module 80A are increased incrementally from the address 92A, such as the address 92B "0001110 . . . 01" (Bit 0 and Bit 26 to Bit 28 are "1") is increased from the address 92A by one. When it comes to the last address 92C (and also the largest address) in the memory module 80A, the value of the address has been increased to a binary number of "00011101 . . . 1" (Bit 0 to Bit 24 and Bit 26 to Bit 28 are "1"), which represents the four hundred millionth address from the address 86A.

From the above description, after this present invention finish sorting the memory modules by memory size and assigning the addresses accordingly, in the memory module of a greater size the address assigned to the memory unit will be smaller. Furthermore, after the sorting and address assigning, the address in each individual memory module will have its own unique bit-pattern. As shown in FIG. 4, for each address located in the memory module 80C (such as the address 86A to 86D), although the value of Bit 0 to Bit 27 will be jumping between "0" and "1", Bit 28 to Bit 31 will remain as "0." In other words, for each address in the memory module 80C, among the 32 bits in each address, Bit 28 to Bit 31 has formed a common address in effect and Bit 0 to Bit 27 can be viewed as an individual address. For each individual address in the memory module 80C, every address is unique but the common address remains the same. This has resulted in the bit-pattern 96A associated with the memory module 80C. In the bit-pattern 96A, Bit 0 to Bit 27 are specified as "x" in order to represent for each address in the memory module 80C. That is because the value of each bit from Bit 0 to Bit 27 is not a fixed value but an unstable one jumping between "0" and "1", each of which together have formed a unique individual address. On the other hand, in the bit-pattern 96A, the values from Bit 28 to Bit 31 are all a fixed one of "0", which stands for that for every single address in the memory module 80C the value of the bit from Bit 28 to 31 is fixed to "0"; that is also the common address for each address of the memory module 80C. In summary, each address in the memory module 80C has its form as the bit-pattern 96A. Although the value of Bit 0 to Bit 27 is changing over different addresses, the value of Bit 28 to Bit 31 remains to be "0.

By the same token, by observing the addresses allocated to the memory module 80B (such as the address 88A to 88C), it can be told that Bit 31 to Bit 27 remains to be "00010" across those addresses. Only the value of Bit 0 to Bit 27 will be changing over different addresses so as to form the bit-pattern 96B associated with the memory module 80B. In the bit-pattern 96B, Bit 0 to Bit 27 will be changing over different addresses so as to for individual addresses. But Bit 31 to Bit 27 will have a fixed value "00010," which is also the common address for every address in the memory module 80C. In other words, every address in the memory module 80C will match the bit-pattern 96B while Bit 31 to Bit 27 is fixed to "00010" and Bit 0 to Bit 26 in the bit-pattern 96B are specified as "x", a value of "0" or "1".

As shown in FIG. 4, each address in the memory module 80D (such as the address 90A to 90C) will match the bit-pattern 96C. Bit 31 to Bit 26 will be fixed to "000110," which stands for that among the sixty-four million addresses in the memory module 80D, Bit 31 to Bit 26 are fixed to "000110." In this way, the thirty-two million address in the memory module 80A all match the bit-pattern 96D while Bit 31 to Bit 25 are fixed to "0001110." In summary, the present invention can obtain associated bit-patterns according to the address allocation for each memory module. As shown in the example of FIG. 4, the memory module 80A to 80D is respectively associated to the bit-pattern 96D, 96B, 96A, and 96C. Each bit-pattern stands for the common property shared by separate addresses in each memory module. While performing initial address decoding for determining in which memory module the given address is located, the present invention compares whether the given address matches the bit-pattern 96A to 96D. For example, given that Bit 28 to Bit 31 of the given address are all "0", which happens to match the bit-pattern 96A, it means that the given address is located in the memory module 80C. By the same token, given that Bit 31 to Bit 25 of the given address is "0001110," the given address is located in the memory module 80A. Please note that after sorting and assigning addressees by size, the bit-patterns associated with each memory module are mutually exclusive. That is, if the given address matches a certain bit-pattern, it will not match any other bit-patterns. As shown in FIG. 4, given that Bit 31 to Bit 28 of a given address is "0000," which matches the bit-pattern 96A, the given address must not match the bit-pattern 96B to 96D since Bit 28 of the bit-pattern 96B to 96D are all "1." By the same token, given that a given address matches the bit-pattern 96B and Bit 31 to Bit 27 is "00010," the given address will definitely not match the bit-patterns 96A, 96C, and 96D. This is because Bit 28 of the bit-pattern 96A is "0" and Bit 27 of the bit-pattern 96C and 96D are all "1." In the same way, the given address which matches the bit-pattern 96D must not match the bit-patterns 96A to 96C because Bit 28 in the bit-pattern 96A is "0" and Bit 28 in the bit-pattern 96D is "1"; Bit 27 in the bit-pattern 96D is "1" and Bit 27 in the bit-pattern 96D is "1"; and Bit 26 in the bit-pattern 96C is "0" and Bit 26 in the bit-pattern 96D is "1." In fact, the mutually exclusive bit-patterns result from assigning addresses by size of each memory module. First of all, it can be told from each bit-pattern associated with the memory modules that for those bits without a fixed value (also bit specified by "x") in each bit-pattern, there is a direct relation between the number of bits and the memory size of the associated memory module. Because an address sequence is increased from the smallest address incrementally to the largest address in the same memory module, there must be a certain number of bits the value of which are changing so as to make each memory unit maps to a unique address. Take the memory module 80C in the FIG. 4 for example, there is a total of two hundred fifty-six million (2^28) memory units. Therefore, in the associated bit-pattern 96A, Bit 0 to Bit 27 are changing over time so as to compose (2^28) kinds of different addresses. By the same token, in the memory module 80A of the smallest memory size, the memory module 80A has only a size of thirty-two million (2^25) bits; therefore, in the associated bit-pattern 96D, it can create 2^25 unique addresses simply with the variation of Bit 0 to Bit 24. In the end, the variation and the "1" carried from the increment in bit-patterns enable the mutual exclusiveness of the bit-patterns. For example, the mutual exclusiveness between the bit-pattern 96A and 96B comes from the different Bit 28; however, the "1" of Bit 28 in the bit-pattern 96B is actually carried from Bit 27 in the address 86D. (Please refer to 86D and 88A for the comparison.) Thus, the "1" of Bit 28 in the bit-pattern 96B actually stands for the memory size of the memory module 80C, and all addresses in the memory module 80C will not carry "1" to Bit 28. On the other hand, since the memory size of the memory module 80B is smaller than the size of the memory module 80C, the associated bit-pattern 96B can create unique addresses by changing the value of Bit 0 to Bit 26. Furthermore, the value of Bit 31 to Bit 28 in the bit-pattern 96B will be fixed to "1" so as to make the common address for every address. As a result, the mutual exclusives between the bit-pattern 96A and 96B will be established. By the same token, in the bit-pattern 96C, the "1" of Bit 27 is carried from the incremental address 88C in the bit-pattern 96B. No one address in the memory module 80B will have a carry bit for Bit 27. The associated memory module 80D associated with the bit-pattern 96C has a memory size of 64 million bits; so it can create 64 million addresses simply with the variation between Bit 0 to Bit 25. Therefore, the "1" in Bit 27 in the bit-pattern 96C will enable the mutual exclusiveness between the bit-pattern 96C and 96B. Analogically, the "1" carried from the address 90C to Bit 26 in the bit-pattern 96D can enable the mutual exclusiveness between the bit-pattern 96D and 96C.

By using the mutually exclusive bit-patterns, the present invention can determine the memory module in which the given address is located by comparing bit-patterns. Because the given address that matches a bit-pattern must not match any other bit-patterns. Without the sorting process disclosed in the present invention, the common addresses for each individual memory module will not be mutually exclusive. For example, the address assigning in FIG. 2 can be summarized as: in FIG. 2, Bit 25 to Bit 31 of each address in the memory module 30A is fixed to "0" while Bit 28 to Bit 31 of each address in the memory module 30B is also fixed to "0." However, even if Bit 18 to Bit 30 of a given address is "0" and matches the common address of the memory module 30B, the given address might still be located in the memory module 30A instead of the memory module 30B.

Figure 5:
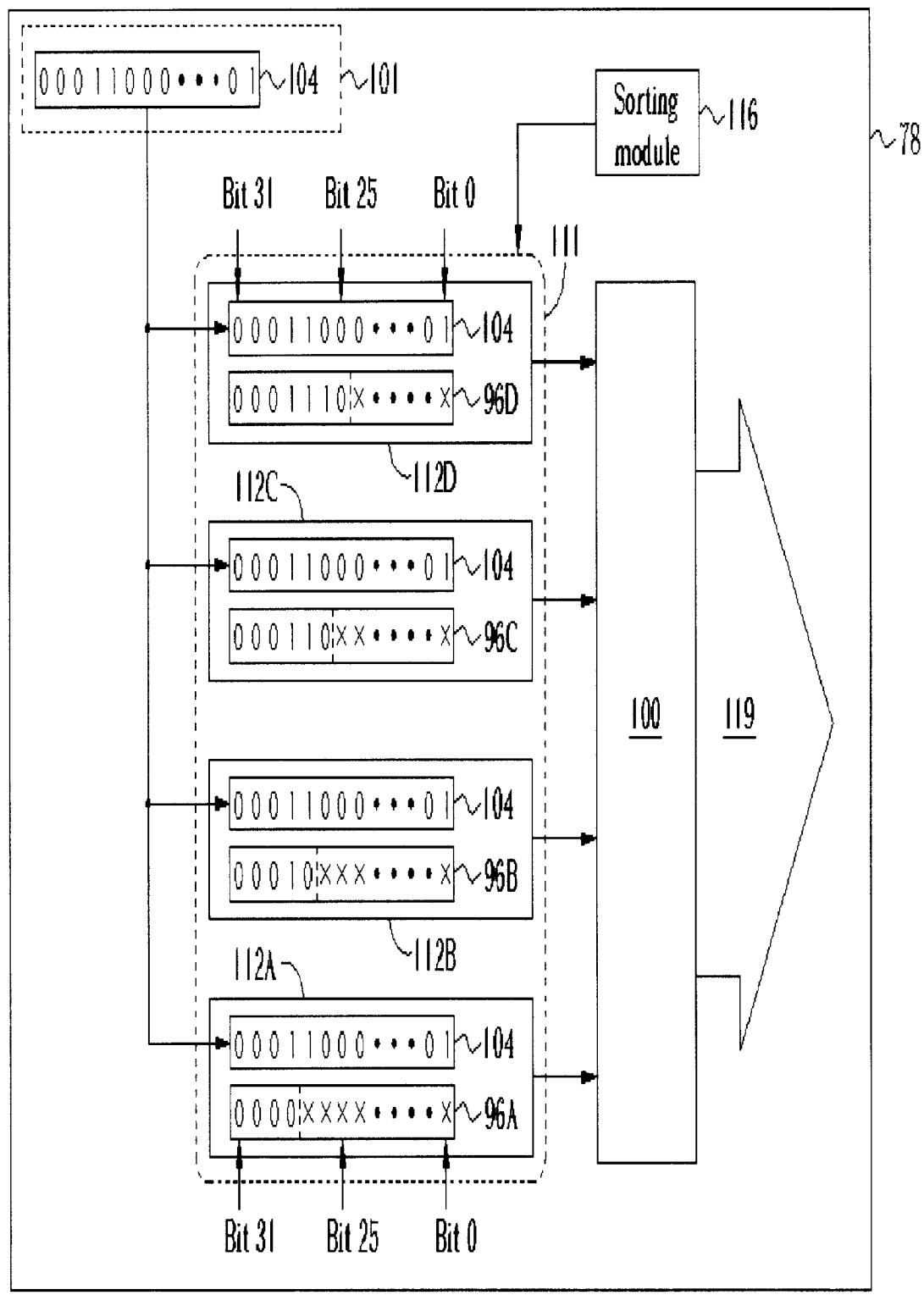
FIG. 5 is a functional block diagram of a control circuit.

For the convenience of implementation, each bit-pattern can derive its own associated standard address and mask. As shown as the standard address 98A to 98D in FIG. 4, each standard address has one associated mask 99A to 99D. In each mask, the bit of which the value is "0" stands for the bit without a fixed value, specified as "x", in the bit-pattern; in parallel, the bit of which the value is "1" stands for the bit with a fixed value in the bit-pattern. As for what value each bit of a fixed value in the bit-pattern actually has, it is recorded in the associated bit of the standard address. For example, in the mask 99B associated with the bit-pattern 96B the value of Bit 0 to Bit 26 are all "0", which stands for that Bit 0 to Bit 26 in the bit-pattern 96B do not have a fixed value; and the value "1" of Bit 27 to Bit 31 in the mask 99B stands for a fixed value existing for Bit 27 to Bit 31 in the bit-pattern 96B. As for what value Bit 27 to Bit 31 in the bit-pattern actually has, it is recorded in the associated bit of the standard address. In other words, Bit 27 to Bit 31 in the standard address 98B and the bit-pattern 96B are equal, and other bits in the standard 98B can be of any value. (For example, in FIG. 4, those bits not associated with bits of a value "1" in each standard address are filled in "0.") Take the associated mask 99D and standard address 98D of the bit-pattern 97D as another example, the bit-pattern 96D has an associated mask 99D and a standard address 98D; because the values of each bit in Bit 27 to Bit 31 in the standard address 96D are all "1", which stands for that the value of Bit 31 to Bit 25 is fixed to the same value as Bit 31 to Bit 25, "0001110", in the standard address 98D. As described above, because in the bit-patterns associated with each memory module the number of bits without a fixed value is relevant to the memory size of the associated memory module, and the masks associated with each memory module can be generated from the memory size of the associated memory module. For example, given that the memory module has a size of 256 million bits, the value of its memory size can be represented as a binary number of "00010 . . . 0" (only Bit 28 is "1"). Then the mask 99A of the memory module 80C can be built by subtracting 1 from the value to be a binary number of "00001 . . . 1" (Bit 0 to Bit 27 are "1") and reversing all bits to be "11110 . . . 0" (Bit 28 to Bit 31 are "1"), Please refer to FIG. 5 (and also FIG. 4). FIG. 5 is a functional block diagram used for implementing initial address decoding. The control circuit 78 is equipped with an access module 101, a sorting module 116, a comparison module 111 and a logic module 100. The comparison module 111 is equipped with four comparative units 112A to 112D associated with a memory module. The access module 101 is used for caching the given address 104 transmitted from the CPU 62 (or other circuits). The comparison units 112A to 112D in the comparison module are used to check whether the given address matches the bit-pattern associated with each memory module respectively. Based on the comparison result of each comparison unit 112A to 112D, the logic module can provide a decoding result 119 for reflecting whether the given address is located in the memory module 80A to 80D. The control circuit 78 is operated as follows: when the computer 60 is booting, the control circuit 78 will scan through each memory module 80A to 80D in the memory apparatus 66 to determine the memory size of each memory module. What happens next is the sorting module 116 decides the order of address assigning based on the memory size of each memory module; and the control circuit 78 can associate the memory unit in each memory module to an address based on the order determined by the sorting module 116. In the meanwhile, the sorting module 116 determines the bit-pattern (and mask, standard address) associated with each memory module based on the result of the sorting and address assigning and accordingly configures each comparison bit 112A to 112D and the logic module 100. In this way, while the CPU 61 (or other circuits) is going to access a certain memory unit in the memory apparatus 66, the address of the particular memory unit can be cached in the access module 101 as the given address 104. The control circuit 78 will perform initial address decoding for the given address 104 by having each comparison unit 112A to 112D compare the given address 104 with the bit-pattern associated with each memory module and determine which bit-pattern the given address 104 matches; and the logic module 100 will provide the decoding result 119 of initial address decoding based on the comparison with each comparative unit 112A to 112D.

To illustrate the process in which the control circuit 78 performs initial address decoding, FIG. 5 uses the same example in FIG. 4. So that the comparative unit 112A to 112D is used for comparing whether the given address 104 matches the bit-pattern 96A to 96D; since the bit-pattern 96A to 96D is associated with the memory module 80C, 80B, 80D and 80A respectively (please also refer to FIG. 4) after sorting, the logic module 100 will be used for determining whether the given address 104 is located in the memory module 80A to 80D based on the comparison with the memory module 112A to 112D. In FIG. 5, it is assumed that the given address 104 is "000110 . . . 01" (Bit 0, Bit 27 and Bit 28 are "1"). After the operation of each comparison unit, one can tell that the given address 104 matches the bit-pattern 96C since Bit 31 to Bit 26 are "000110". Therefore, the comparison unit 112C will output a result of "true" (such as the voltage at a high level) to reflect the fact that the given address 104 is located in the memory module 80D. Comparatively, take FIG. 5 for example, the given address will not match the bit-pattern 96D because Bit 31 to Bit 25 are "0001100" and Bit 31 to Bit 25 in the bit-pattern 96D are "000110". Therefore, the comparison unit 112C will output a result of "false" (such as the voltage at a low level) to reflect the fact that the given address 104 is not located in the memory module 80A. In fact, the given address 104 in FIG. 5 is the address 90B located in the memory module 80D in the FIG. 4.

Figure 1:
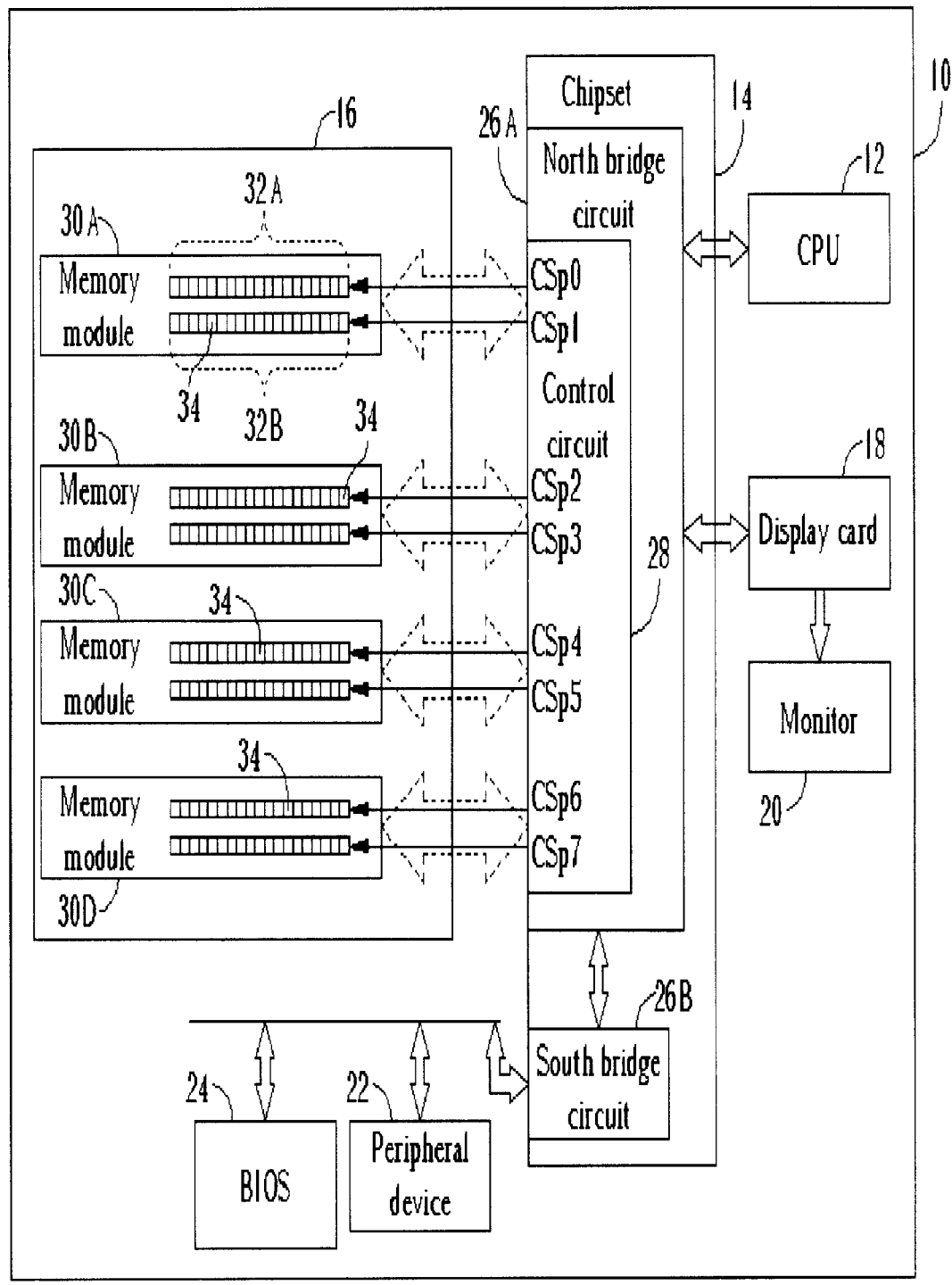
FIG. 1 is a functional block diagram of a prior art computer.
Figure 6:
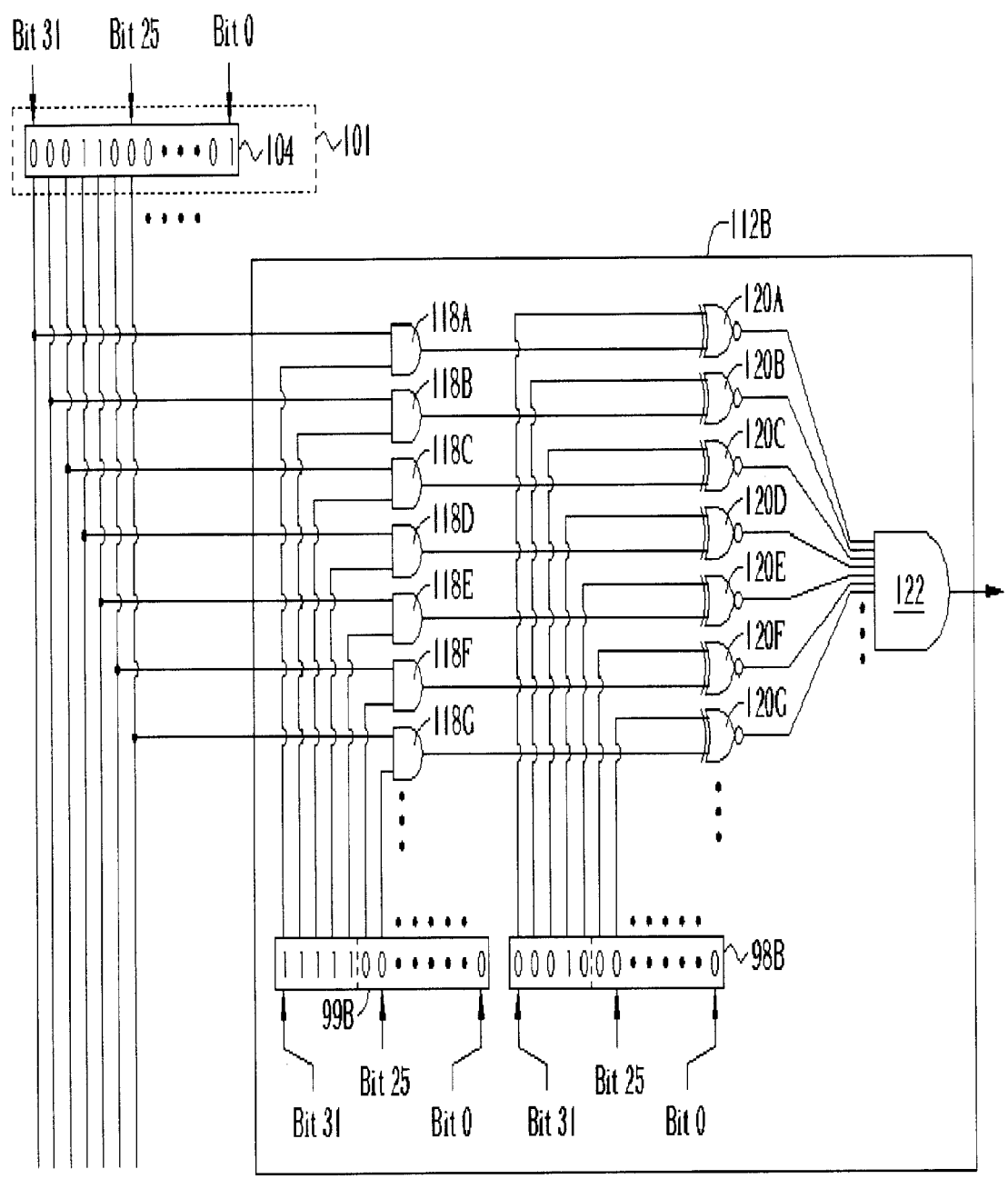
FIG. 6 is a functional block diagram of comparison units.

Please refer to FIG. 6. FIG. 6 is a functional block diagram that takes the comparison unit 112B as example; the function of the comparison unit 112B is used for comparing whether the given address matches the bit-pattern 96B, As described in FIG. 4, the present invention can deduct the associated standard address and mask from each bit-pattern, and while implementing the comparison unit 112B, the mask 99B and the standard address 98B can be associated with the bit-pattern 96B. As shown in FIG. 6, the comparison unit 112B can be equipped with a plurality of AND gates and NXOR gates. Each AND gate is used for ANDing one bit in the given address 104 with another bit in the mask 99B. For example, AND gates 118A to 118G are used for ANDing Bit 31 to Bit 25 in the given address 104 with Bit 31 to Bit 25 in the mask 99B. The NXOR Gates are used for further NXORing the result of each AND operation with another bit in the standard address. For example, NXOR gates 120A to 120G in FIG. 6 are used for NXORing the result of each AND operation of the gates 118A to 118G and one bit in the standard address. The results output from each NXOR gate will go through the AND gate 122 again, and the comparison result of the comparative unit 112B will be out from the AND gate 122. While ANDing each bit in the mask with the given address 104, each AND gate "masks" those bits not required for comparison in the given address 104 and transmits the value of bits required for comparison to the NXOR gates; while NXORing the result from each AND gate with each bit in the standard address, the NXOR gates compares whether die bits required for comparison in the given address 104 is equal to the associated bits in the standard address; the AND gate 122 integrates the outputs from all of the NXOR gates. Take the example shown in FIG. 6, the value of cacti bit from Bit 27 to Bit 31 in the mask 99B is actually '1', which stands for that the value of Bit 27 to Bit 31 in the associated bit-pattern 96B is fixed. The comparison unit 112B will cheek whether Bit 27 to Bit 31 in the given address 104 matches Bit 27 to Bit 31 in the standard address 98B respectively. The value '1' from Bit 31 to Bit 27 in the mask 998 will result in the output of the AND gate 118A to 118E being determined by Bit 31 to Bit 27 in the given address 104. The result is in effect equal to transmitting each value of Bit 31 to Bit 27 in the given address 104 to the NXOR gate 120A to 120E respectively. Furthermore, the NXOR operation performed by the NXOR gates 120A and 120E is in effect equal to comparing whether Bit 27 to Bit 31 in the given address 104 matches Bit 27 to Bit 31 in the standard address 98B respectively. If equal, the AND gate 122 will have an output of "true." In comparison. given that Bit 26 and Bit 25 in the mask 99B are '0', the outputs of the AND gate 118F and 118G will be "false" no matter what the values of Bit 26 and Bit 25 in the given address 104 are; this is in effect equal to masking Bit 26 and Bit 25 in the given address l04. The outputs of "false" from the AND gates 118F and 118G along with the values of '0' of Bit 26 and Bit 25 in the standard address 98B will make the outputs of the NXOR gate 118F and 118G to always be "true." this will result in the NXOR gates 120A to 120E controlling the output of the AND gate 122. FIG. 6 also makes the assumption that the value of the given address 104 is same as the value in FIG. 5; under the circumstance, since the value of Bit 27 in the given address 104 is '1', which does not match the value of '0' of Bit 27 in the standard address 98B, the output of the NXOR gate 120E is "false." This will result in the output of the AND gate 122 in the comparison module 112B being "fake." In FIG. 5 and FIG. 6, each functional block in the present invention can be implemented either by hardware, software program in the micro-control circuit, or a mix of these two kinds. For example, the sorting module 116 and the logic module 100 in FIG. 5 can be implemented by software. Though the comparison units are implemented as AND gazes and NXOR gates in FIG. 6, they can also be implemented in hardware. Therefore, while executing the functional block in FIG. 6 and FIG. 5, the software program can be stored in the BIOS 24. (Please refer to FIG. 1). From the discussion of embodiment above, the present invention performs initial address decoding by comparing bit-patterns so as to enable a fast and efficient embodiment. Because while each comparison unit is performing bit-pattern comparison, it is actually comparing whether the bits of fixed values in the bit-pattern actually match the associated bits in the given address 104. The comparison of those bits required for it is done in parallel and integrated swiftly. For example, while the comparison unit 112B in FIG. 6 is operating, the present invention can check whether Bit 25 to Bit 31 in the given address 104 actually matches the associated bits in the standard address 98B and AND the result of comparison together. In terms of the operation time of digital circuits, since each comparison unit in the present invention can fulfill the mask operations for each bit in the given address 104 at the same time and the AND operation for the result of comparison, the amount of time required for the process above is approximately: the time required for the mask operation of a single bit in the AND gate, the time required for the comparison of a single bit in the NXOR gate, plus the time required for the integration of the result of each NXOR gate. In the three different operations above, each of them may be implemented with a single logic gate. Therefore, the present invention can accomplish the operation of the whole comparison module swiftly.

Comparatively, because the prior art performs initial address decoding by subtraction (equal to addition in effect), it needs to wait for the carry bit as a result from the ADD operation of the next bit. Therefore the total amount of time required is the sum of the time required for the ADD operation for each bit; take the decoding of a 32-bit address for example, in general for Bit 31 to Bit 25 it will require at least 7 gate delays to accomplish. Obviously, the initial address decoding of the present invention can be performed more efficiently.

Figure 7A:
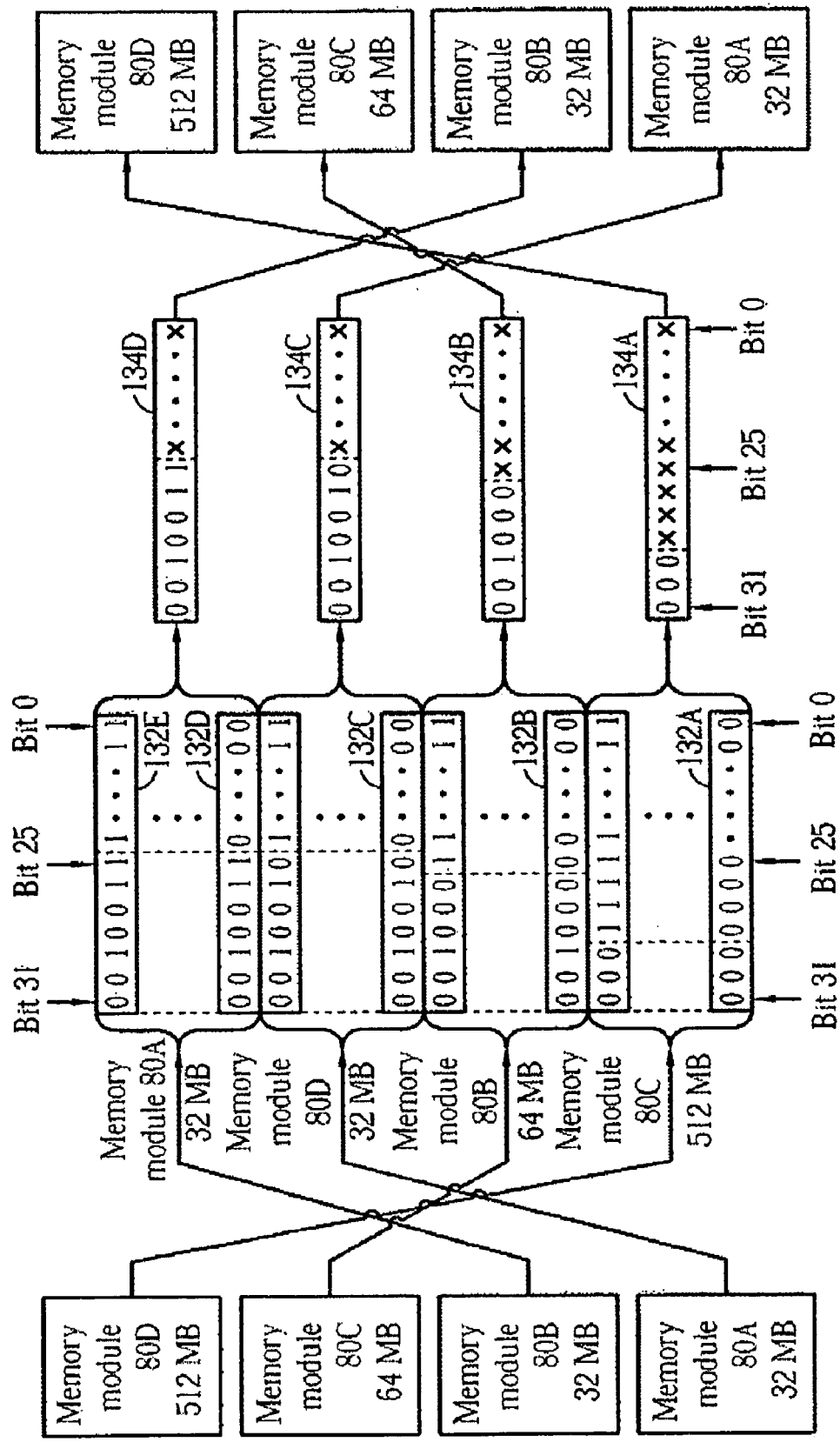
FIGS. 7A and 7B are diagrams showing how the present invention assigns addresses using different sorting methods under the third kind of memory module allocation.
Figure 7B:
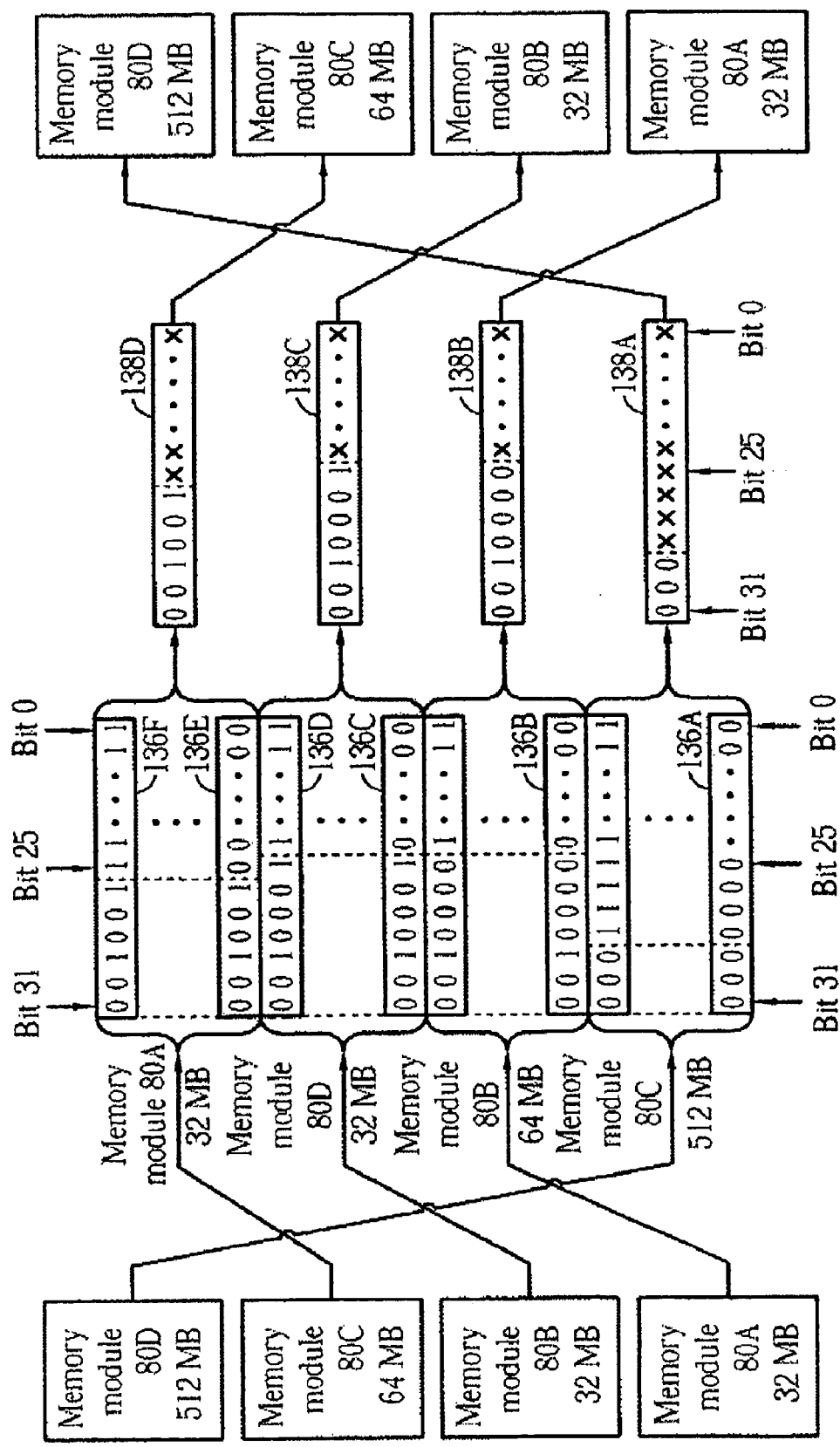

As described above, the present invention basically sorts by memory size of each memory module in order to assign the address to each memory module based on its memory size so as to assign the memory unit in the memory module of a greater memory size a smaller address; accordingly, the mutually exclusive bit-patterns can be deducted from the addresses assigned to different memory modules as a basis of initial address decoding. Certainly when there are two memory modules of the same size, their orders are not fixed. Besides, when there is one or more memory modules (called memory module B hereafter) the memory size of which is equal to the memory size of another memory module (called memory module A hereafter), the address of the memory module A should be placed continuously in sequence with the address of each memory module B. The address of the memory module A can be greater or smaller than the address of each memory module B. No matter if the address of each memory unit in the memory module A is smaller or greater than the address of each memory module B, the mutually exclusive bit-patterns can be generated. Concerning the circumstance, please refer to FIG. 7A and FIG. 7B. FIG. 7A and FIG. 7B show how the addresses are assigned by different sorting methods under the same memory module allocation of the present invention. Given that the memory module 80A to 80D has a size of 32 million, 32 million, 64 million and 512 million respectively, in FIG. 7A, the allocation of each memory module is based on the sorting principle of the present invention so as to enable the address of each memory module to be assigned incrementally in the sequence of the memory module 80D, the memory module 80C, the memory module 80A and the memory module 80B. The memory module 80D of the greatest memory size is assigned the smallest address. FIG. 7A specifies the greatest and smallest address (such as the address 132A to 132E) and their derived bit-patterns 134A to 134D. From each bit-pattern 134A to 135D one can tell those bit-patterns are indeed mutually exclusive.

However, in the memory module allocation in FIG. 7A and FIG. 7B, it can be found that the memory size of 64 million bits in the memory module 80C is equal to the sum of the memory sizes of the two memory modules 80A and 80B. One can view the memory module 80C as a memory module A, the memory size of which is equal to the sum of the memory sizes of the two memory modules B (that is the memory module 80B and 80A). Under the circumstance, even each address of the memory module 80C is greater than each address of the memory module 80A and 80B, the mutually exclusive bit-patterns can still be generated. As shown in FIG. 7B, the sorting method in FIG. 7B is sorted by the incrementally increased address of each memory unit assigned in the order of the memory module 80D, 80A, 80B, and 80C. FIG. 7B also shows that the greatest and smallest address of each memory module under this kind of sorting (such as the address 136A to 136F) and their derived associated bit-patterns 138A to 138D. As shown in FIG. 7B, although the memory size of the memory module 80C is greater than each individual memory size of the memory module 80A and 80B, the sorting method in FIG. 7B will still make the bit-patterns associated with each memory module mutually exclusive.

Generally speaking, in the state of the art, the memory size of each memory module is a power of 2. Therefore, while the sum of the memory sizes of the memory modules B is equal to the memory size of the memory module A, if the address sequence is increased incrementally from each memory module B to the memory module A, there will be an additional carry bit being generated in the memory module A, and the additional carry bit "1" will become the fixed value of each address in the memory module A so as to make the associated bit-pattern of the memory module A mutually exclusive to the associated bit-pattern of the memory module B. As shown in FIG. 7B, when the address sequence is increased incrementally from the address 136D of the memory module 80B to the address 136E of the memory module 80C, there will be a carry bit "1" in Bit 26 in the address 136E, and the value "1" of Bit 26 will become the fixed value of each address in the memory module 80C. The bit-pattern 138D associated with the memory module 80C then become mutually exclusive to the patterns 138C and 138C associated with the memory module 80A and 80B respectively. Comparatively, in the sorting in FIG. 7B, if the memory size of the memory module 80C is not 64 million bits but 128 million bits and the address of the memory module 80C is still increased from the address 136D, then the bit-pattern associated with the memory module 80C should be "0010x . . . x" (Only Bit 31 to Bit 28 is a fixed value "0010") but not mutually exclusive to the bit-patterns 138B and 138C associated with the memory module 80A and 80B.

In other words, as long as the sum of the sizes of a certain number of the memory modules B is equal to the size of the memory module A (the memory module A is composed of one or a plurality of memory modules), no matter if the address sequence is increased incrementally from the address of the memory module A to each of the memory modules B (such as the situation in FIG. 7A) or from each address of the memory modules B to the address of the memory module A (such as the situation in FIG. 7B), the bit-patterns will be mutually exclusive with a continuous order of the addresses of each of the memory modules B and the memory module A. The continuous order claimed here requires: (1) The address of each of the memory modules B to be placed continuously, that is, except for the first memory module B (the memory module B of a smallest address), other addresses of the memory modules B are increased incrementally from the address of another memory module B. For example, in FIG. 7A and FIG. 7B, the addresses in the memory module 80A and 80B have formulated a continuous address sequence. (2) The smallest address in the memory module A is increased incrementally from the largest address among the memory modules B (such as the situation in FIG. 7B) or the smallest address in each memory module is increased incrementally from the memory module A (such as the situation in FIG. 7A).

Figure 8A:
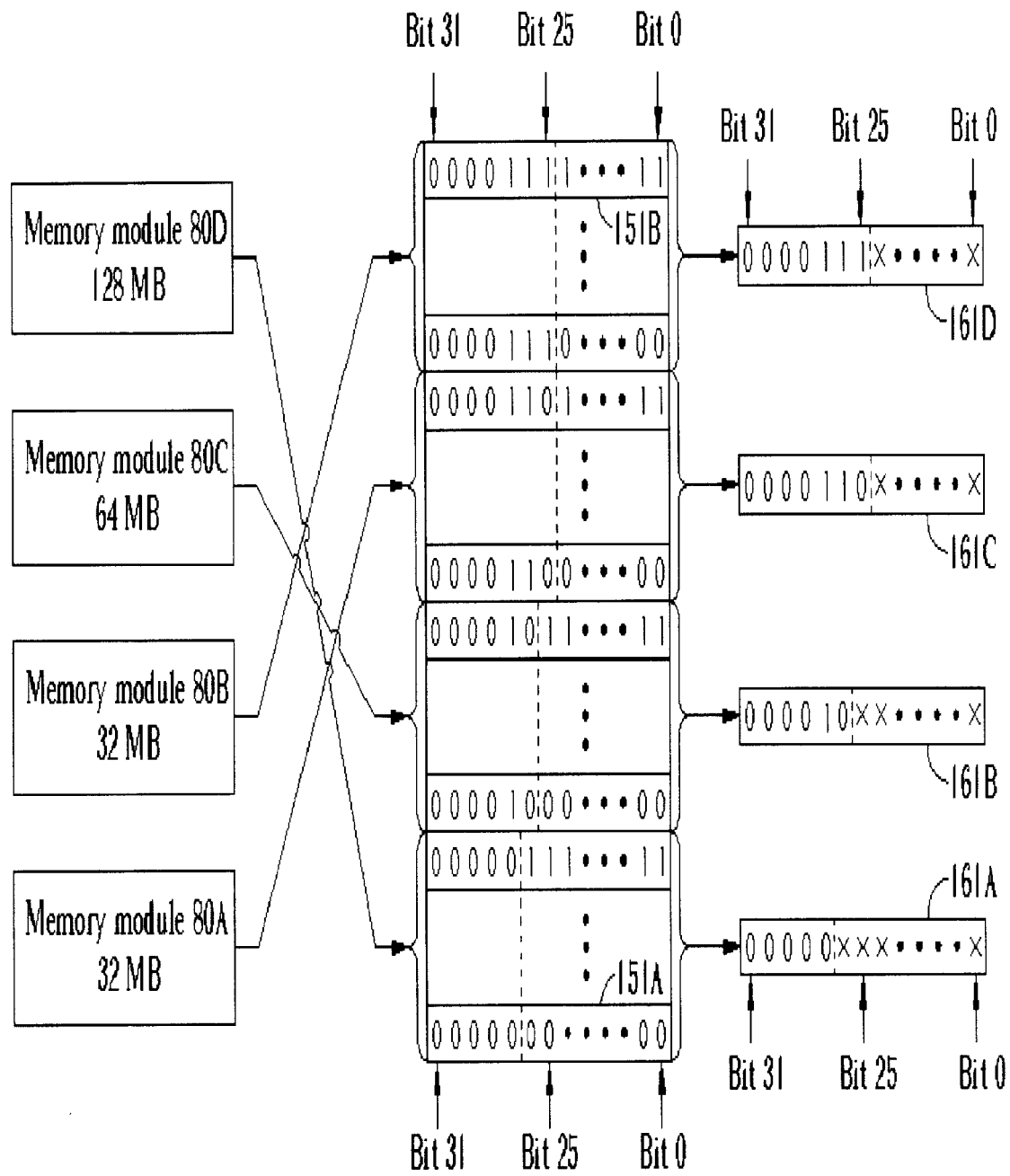
FIG. 8A to FIG. 8D are diagrams showing how the addresses are assigned using different sorting methods under another kind of memory module allocation.
Figure 8B:
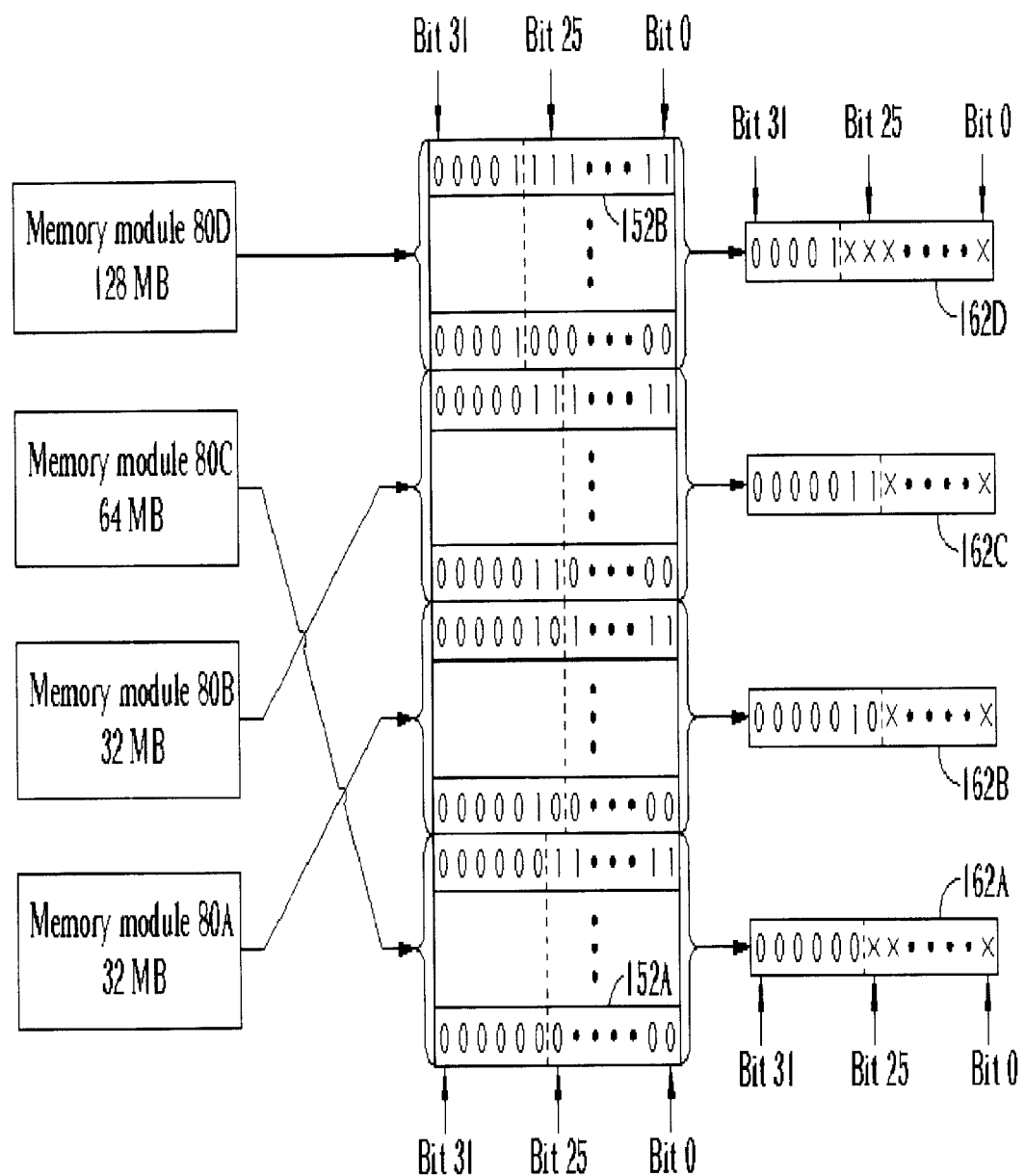
Figure 8C:
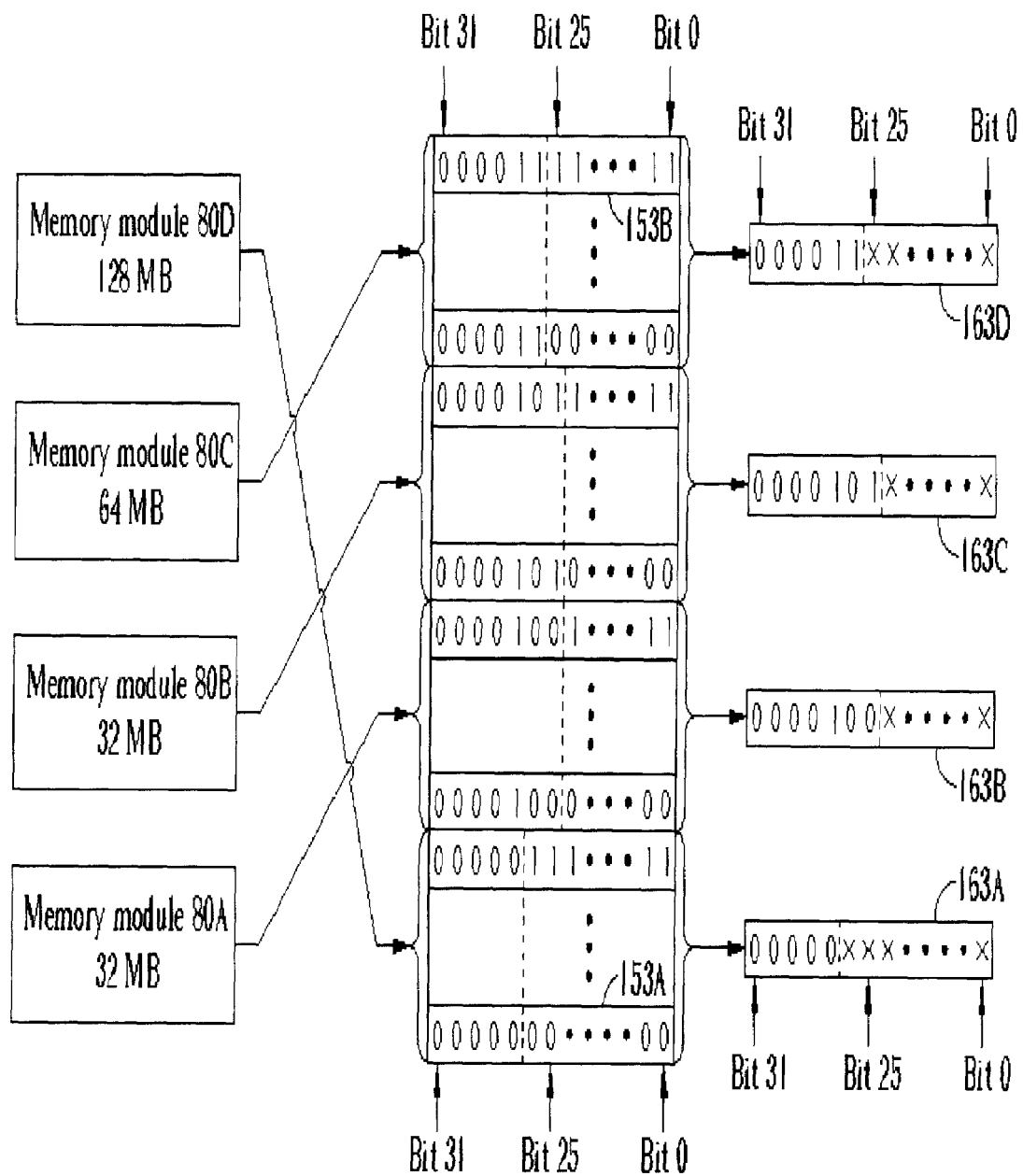
Figure 8D:
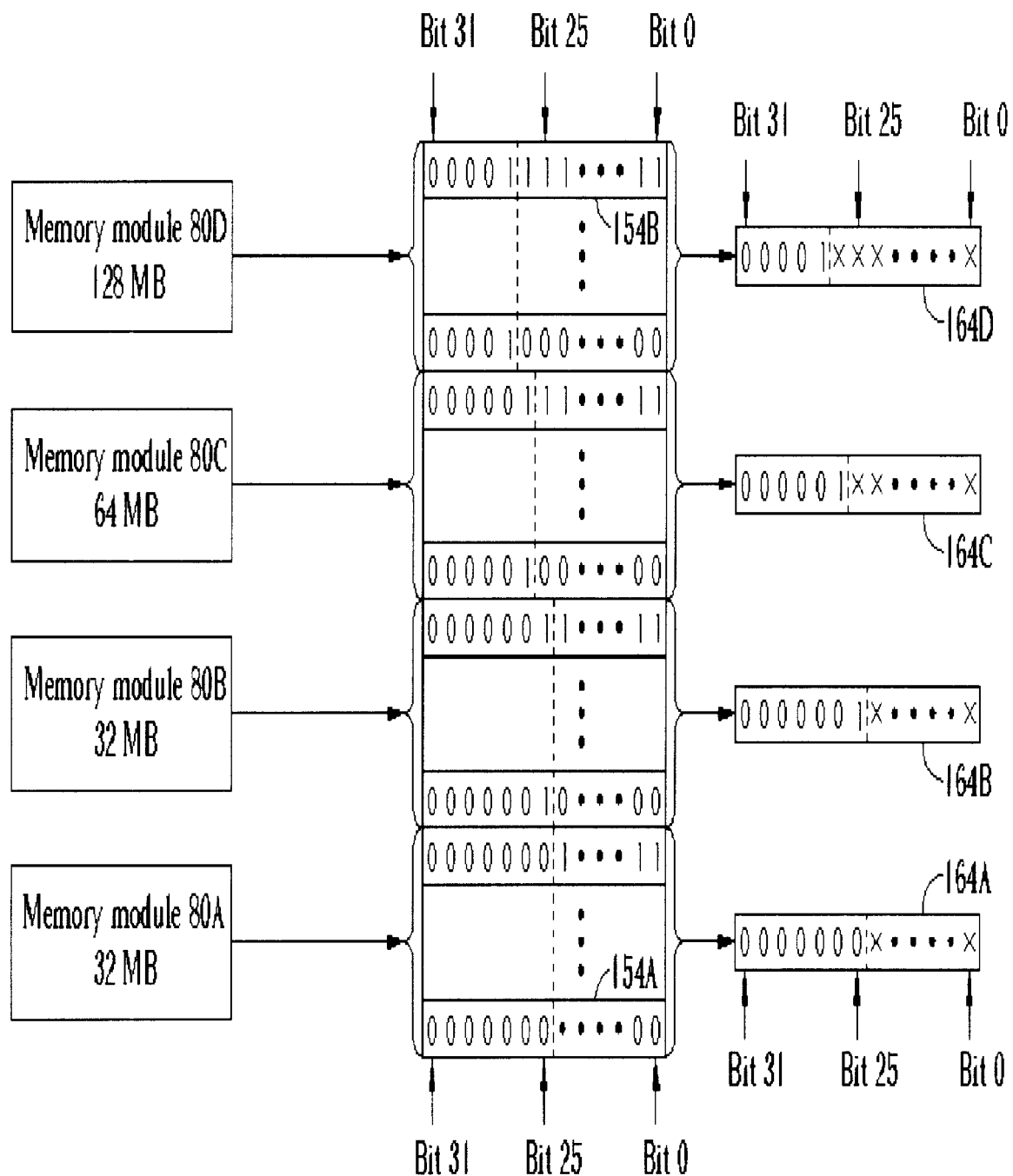

As for further application of the above, please refer to FIG. 8A to FIG. 8D. FIG. 8A to FIG. 8D show how the addresses are assigned using different sorting methods under another kind of memory module allocation; FIG. 8A to FIG. 8D show respectively the bit-pattern 161A to 161D, 162A to 162D, 163A to 163D and 164A to 164D associated with each memory module. As shown in the examples of FIG. 8A to FIG. 8D, given that the memory module 80A to 80D has a size of 32 million, 32 million, 64 million and 128 million respectively, in FIG. 7A, the memory size of the memory module 80C is equal to the sum of the sizes of the memory module 80A and 80B, the memory size of the memory module 80D is equal to the sum of the sizes of the memory module 80A to 80C. Therefore the addresses of the memory module 80C can be ordered continuously before or after the memory module 80A and 80B, and the addresses of the memory module 80D can be ordered continuously before or after the memory module 80A to 80C. There is a total of four kinds of sorting which can generate mutually exclusive bit-patterns; FIG. 8A to FIG. 8D have shown the address assigning and the associated bit-patterns under the four kinds of sorting. Concerning the swappable order of the memory modules of the same size (e.g. the memory module 80A and 80B), there will be eight kinds of variations. The sorting in FIG. 8A is a result of sorting the memory modules in the order of 80D, 80C, 80A and 80B by their memory sizes. However, as discussed in the above paragraph, since the memory size of the memory module 80D is the sum of the memory module 80A to 80C, the address of the memory module 80D can be greater than the addresses of the memory module 80A to 80C. As shown in FIG. 8B, even the address is ordered by the order of the memory module 80C, 80A, 80B to 80D, mutually exclusive bit-patterns 162A to 162D can still be generated. Besides, since the memory size of the memory module 80C is equal to the sum of the memory module 80A and 80B, the sorting order of the memory module 80C and 80A and 80B in FIG. 8A can be reversed as what is shown in FIG. 8C, incremental addresses by degrees in the order of the memory module 80D, 80A, 80B and 80C. The order of the memory module 80A to 80C in FIG. 8B can be rearranged as what is shown in FIG. 8D, incremental addresses by degrees in the order of the memory module 80A, 80B, 80C and 80D. Please note that the sorting of FIG. 8A and FIG. 8D are actually the opposite to each other; however, since the sum of the memory size of each memory module is equal, the sorting in FIG. 8D can generate mutually exclusive bit-patterns 164A to 164D.

For FIGS. 7A, 7B or 8A to 8D, the control circuit 78 in FIG. 5 can be applied to implement the initial address decoding of the present invention. For example, if one wants to perform initial address decoding under the sorting of FIG. 8D, the comparison units 112A to 112D in FIG. 5 can compare whether the given address 104 matches the bit-patterns 164A to 164D in FIG. 8D; and the logic module 100 in FIG. 5 can generate decoding results from the results of comparison units 112A to 112D.

To sum up the sorting principles of the present invention, it basically assigns incremental addresses in the order of the size of memory module (from large to small). However, if the sum of the memory size of certain memory modules B is equal to the memory size of some other modules A, the address of the memory module A can be ordered continuously before or after each memory module B. Besides, the previous finding can be derived as if "the sum of sizes of memory modules before a certain memory module is an integer-number times of its own size", the switch of the sorting order is allowed. According to the sorting principles of the present invention, memory modules can be associated with mutually exclusive bit-patterns and perform initial address decoding by comparing bit-patterns. Although FIG. 4 to FIG. 8D above are all for the discussion of how the present invention can determine in which memory module the given address is located, the discussion above can still be generalized as viewing memory modules as sections composed of memory units. The spirit of the present invention is to derive associated bit-patterns (and associated masks and standard addresses) in order to determine the section in which one given address is located. For example, as long as we view the rank memory array in each memory module as a section, the present invention can also be used to determine in which rank memory array the given address is located.

The prior art address decoding technology subtract a given address from each ending address in order to determine the relative size of the given address and those ending addresses and further determine in which memory module (or rank memory array) the given address is located so as to finish the initial address decoding. However, while operating binary additions to subtract the given address from the ending addresses, the addition operation of each bit is required to be performed after the carry bit from the last bit is determined, the whole operation which subtracts the given address from the ending address can only be operated bit-by-bit. The amount of time consumed is the sum of the time for the addition operation of each bit. Therefore, the time required for performing initial address decoding is longer. Comparatively, the present invention performs initial address decoding by comparing bit-patterns; as long as the given address matches a certain bit-pattern, the given address can be determined to be located in the memory module associated with the certain bit-pattern. While comparing bit-patterns, the present invention also compares whether a plurality of bits with a fixed value are actually equal to the associated bits in the given address, no matter how many bit-comparisons is performed, the time required is basically the same as the time required for a single bit. Therefore, the present invention can perform initial address decoding swiftly with a higher efficiency to determine in which memory module or rank memory array the given address is located so as to promote the access efficiency of the whole computer system to the memory resources.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A control circuit of memory address decoding for determining whether a given address is located in one of a plurality of sections, each section having at least one memory unit and each memory unit having a unique corresponding address, the corresponding address using the binary system, the control circuit comprising:

an access module for receiving the given address;

a sorting module for making the corresponding address of the section with greater size smaller than the corresponding address of the section with smaller size, and if the size of a first section is equal to the size of a second section, the first and the second sections are capable of being swapped; and a comparing module for building a bit-pattern for each section based on its corresponding addresses and sending a plurality of comparison signals after comparing the given address with those of each bit-pattern, the comparing module comprising a plurality of comparing units, each comparing unit comprising a plurality of first level AND gates, a plurality of NXOR gates, and a second level AND gate, each of the first level AND states having two inputs for respectively receiving a mask bit generated from the bit-patterns and an associated bit of the given address, each of the NXOR gates having two inputs for respectively receiving the output of one of the first level AND states and a standard address generated from the bit-patterns, the inputs of the second level AND state being connected to the outputs of the NXOR gates and thereby sending out the comparison signals.

2. The control circuit of claim 1 further comprising a logic module responsible for receiving the comparison signals and sending a decoding result to determine the given address is located in one of the sections.

3. The control circuit of claim 1 wherein the sections are a plurality of memory modules.

4. The control circuit of claim 1 wherein the single bit-pattern is built for each section in the comparing module, the bit-pattern consisting of all common bits of the corresponding addresses in each section.

* * * * *